US010391736B2

(12) United States Patent
Huang et al.

(10) Patent No.: US 10,391,736 B2
(45) Date of Patent: Aug. 27, 2019

(54) BREATHABLE AND WATERPROOF COMPOSITE FABRIC AND A METHOD OF MAKING THE SAME

(71) Applicants: Chen-Cheng Huang, Taipei (TW); Pao-Hao Huang, Taipei (TW); Pao-Han Huang, Taipei (TW)

(72) Inventors: Chen-Cheng Huang, Taipei (TW); Pao-Hao Huang, Taipei (TW); Pao-Han Huang, Taipei (TW)

( * ) Notice: Subject to any disclaimer, the term of this patent is extended or adjusted under 35 U.S.C. 154(b) by 208 days.

(21) Appl. No.: 15/437,739

(22) Filed: Feb. 21, 2017

(65) Prior Publication Data

US 2017/0157903 A1 Jun. 8, 2017

Related U.S. Application Data

(63) Continuation-in-part of application No. 14/294,613, filed on Jun. 3, 2014, now Pat. No. 9,713,914.

(30) Foreign Application Priority Data

Jun. 11, 2013 (TW) ............................ 102120734 A

(51) Int. Cl.

*B32B 3/24* (2006.01)
*B32B 3/30* (2006.01)
(Continued)

(52) U.S. Cl.

CPC ................ *B32B 3/266* (2013.01); *B32B 3/30* (2013.01); *B32B 7/14* (2013.01); *B32B 27/12* (2013.01);
(Continued)

(58) Field of Classification Search

None
See application file for complete search history.

(56) References Cited

U.S. PATENT DOCUMENTS 201,640 A 3/1878 Worth et al.
2,032,942 A 3/1936 Linscott et al.
(Continued)

FOREIGN PATENT DOCUMENTS

BE 530061 7/1954
CA 2329604 A1 * 10/2001
(Continued)

OTHER PUBLICATIONS

English Abstract for IT 717460 B, Jul. 1965 (Year: 1965).*
(Continued)

*Primary Examiner* — Jeffrey A Vonch
(74) *Attorney, Agent, or Firm* — Nixon & Vanderhye P.C.

(57) ABSTRACT

A breathable and waterproof composite fabric includes a fabric sheet and a waterproof plastic film. The fabric sheet has a first surface, a second surface and a plurality of micropores extending through the first and second surfaces. The waterproof plastic film is made of a non-porous material and has an outer surface, an inner surface bonded to the first surface, and a plurality of hollow protrusions protruding from the outer surface. Each of the hollow protrusions defines a channel having an inner open end at the inner surface and an outer open end distal from the inner and outer surfaces. A method of making the breathable and waterproof composite fabric is also provided.

9 Claims, 6 Drawing Sheets

(51) Int. Cl.

| | |
|---|---|
| ***B32B 5/02*** | (2006.01) |
| ***B32B 27/12*** | (2006.01) |
| ***B32B 37/12*** | (2006.01) |
| ***B32B 7/14*** | (2006.01) |
| ***B32B 3/26*** | (2006.01) |
| ***B32B 38/00*** | (2006.01) |
| ***B32B 37/00*** | (2006.01) |
| *A41D 31/02* | (2019.01) |
| *A41D 31/102* | (2019.01) |
| *B32B 27/32* | (2006.01) |
| *B32B 27/36* | (2006.01) |
| *B32B 38/04* | (2006.01) |
| *B32B 7/02* | (2019.01) |
| *B32B 25/08* | (2006.01) |
| *B32B 25/10* | (2006.01) |
| *B32B 27/08* | (2006.01) |
| *B32B 27/40* | (2006.01) |
| *B32B 3/28* | (2006.01) |
| *B32B 7/03* | (2019.01) |

(52) U.S. Cl.

CPC ...... *B32B 37/0084* (2013.01); *B32B 37/1292* (2013.01); *B32B 38/0036* (2013.01); *A41D 31/02* (2013.01); *A41D 31/102* (2019.02); *A41D 2500/52* (2013.01); *B32B 3/28* (2013.01); *B32B 5/022* (2013.01); *B32B 5/024* (2013.01); *B32B 5/026* (2013.01); *B32B 7/02* (2013.01); *B32B 7/03* (2019.01); *B32B 25/08* (2013.01); *B32B 25/10* (2013.01); *B32B 27/08* (2013.01); *B32B 27/32* (2013.01); *B32B 27/36* (2013.01); *B32B 27/40* (2013.01); *B32B 37/0076* (2013.01); *B32B 2038/047* (2013.01); *B32B 2250/02* (2013.01); *B32B 2250/03* (2013.01); *B32B 2250/40* (2013.01); *B32B 2270/00* (2013.01); *B32B 2274/00* (2013.01); *B32B 2305/026* (2013.01); *B32B 2307/51* (2013.01); *B32B 2307/724* (2013.01); *B32B 2307/728* (2013.01); *B32B 2307/7265* (2013.01); *B32B 2307/73* (2013.01); *B32B 2307/732* (2013.01); *B32B 2323/00* (2013.01); *B32B 2367/00* (2013.01); *B32B 2437/00* (2013.01); *Y10T 156/1056* (2015.01); *Y10T 156/1057* (2015.01); *Y10T 428/24182* (2015.01); *Y10T 428/24281* (2015.01); *Y10T 428/24289* (2015.01); *Y10T 428/24322* (2015.01); *Y10T 428/24826* (2015.01); *Y10T 428/24851* (2015.01); *Y10T 428/24942* (2015.01); *Y10T 442/3854* (2015.04); *Y10T 442/3886* (2015.04); *Y10T 442/3911* (2015.04); *Y10T 442/678* (2015.04); *Y10T 442/679* (2015.04)

(56) References Cited

U.S. PATENT DOCUMENTS 2,055,002 A 9/1936 Chandler
2,068,456 A 1/1937 Hooper
2,388,069 A 10/1945 Meaker et al.
2,485,725 A 10/1949 Francis, Jr.
2,513,838 A 7/1950 Beall
2,698,816 A 1/1955 Dosmann et al.
2,704,730 A 3/1955 Glatt
2,885,303 A 5/1959 Kaplan
2,994,617 A 8/1961 Proctor
3,097,787 A * 7/1963 Schur .................... B65D 29/04 383/103
3,143,436 A 8/1964 Dosmann
3,307,961 A 3/1967 Stiehl et al.
3,331,728 A 7/1967 Lane
3,627,567 A 12/1971 Tensho et al.
3,665,157 A 5/1972 Harada
3,703,432 A * 11/1972 Koski ...................... A41D 3/04 156/202
3,718,059 A 2/1973 Clayton
3,852,090 A 12/1974 Leonard et al.
3,911,186 A 10/1975 Trotman
3,953,566 A 4/1976 Gore
3,989,867 A * 11/1976 Sisson ................ A61F 13/5146 428/132
4,160,058 A 7/1979 K-Gall
4,187,390 A 2/1980 Gore
4,234,637 A 11/1980 Sewell et al.
4,341,216 A * 7/1982 Obenour .......... A61F 13/51478 604/370
4,341,217 A 7/1982 Ferguson et al.
4,344,999 A 8/1982 Gohlke
4,438,167 A 3/1984 Schwarz
4,539,255 A 9/1985 Sato et al.
4,560,611 A 12/1985 Naka et al.
4,636,424 A 1/1987 Amemiya et al.
4,684,568 A 8/1987 Lou
4,713,068 A 12/1987 Wang et al.
4,758,297 A 7/1988 Calligarich
4,898,761 A 2/1990 Dunaway et al.
4,995,930 A 2/1991 Merz et al.
5,256,288 A 10/1993 Lee
5,322,729 A 6/1994 Heeter et al.
5,356,497 A 10/1994 Lee
5,359,735 A 11/1994 Stockwell
5,523,146 A 6/1996 Bodford et al.
5,591,510 A * 1/1997 Junker .................... B32B 3/266 428/132
5,660,918 A 8/1997 Dutta
5,733,626 A 3/1998 Middleton
5,733,628 A * 3/1998 Pelkie .............. A61F 13/15731 428/138
5,762,643 A * 6/1998 Ray .................. A61F 13/15699 604/383
5,773,123 A 6/1998 Anwyll, Jr.
5,888,614 A 3/1999 Slocum et al.
5,935,878 A 8/1999 Glasser
6,119,272 A * 9/2000 Tebbe ............... A41D 19/0068 15/227
6,211,102 B1 4/2001 Jones et al.
6,413,247 B1 * 7/2002 Carlucci ............ A61F 13/5146 428/132
6,492,012 B1 12/2002 Shah
6,627,791 B1 * 9/2003 Veglio ................ A61F 13/5146 428/132
2002/0133132 A1 * 9/2002 Copat .............. A61F 13/15731 604/383
2003/0124308 A1 7/2003 Cree et al.
2003/0215617 A1 * 11/2003 Shehata ............. B32B 38/0008 428/196
2004/0102124 A1 5/2004 Suzuki
2004/0116022 A1 6/2004 Langley et al.
2004/0126531 A1 7/2004 Harvey et al.
2004/0256310 A1 12/2004 Cheng
2005/0084652 A1 * 4/2005 Bonelli .................. A61F 13/51 428/137
2005/0273902 A1 * 12/2005 Sommers .............. A41D 31/02 2/69
2006/0128245 A1 6/2006 Muth et al.
2009/0082746 A1 * 3/2009 Thomas ............... A61F 13/512 604/378
2010/0201024 A1 8/2010 Gibson et al.
2012/0277701 A1 * 11/2012 Stone ............... A61F 13/15731 604/367
2013/0061366 A1 3/2013 Pezzimenti
2013/0280482 A1 10/2013 Huang et al.
2014/0072760 A1 3/2014 Ko et al.

(56) References Cited

U.S. PATENT DOCUMENTS

| | | | | |
|---|---|---|---|---|
| 2014/0363625 A1* | 12/2014 | Huang | B32B 27/12 428/133 |
| 2016/0257091 A1 | 9/2016 | Fornoni et al. | |

FOREIGN PATENT DOCUMENTS

| | | | | |
|---|---|---|---|---|
| CN | 1943530 | | 4/2007 | |
| CN | 200988927 | | 12/2007 | |
| CN | 201350710 | | 11/2009 | |
| CN | 201419531 | | 3/2010 | |
| CN | 201619264 | | 11/2010 | |
| CN | 101940514 | | 1/2011 | |
| CN | 201785645 | | 4/2011 | |
| CN | 102154843 | | 8/2011 | |
| CN | 102501493 | A * | 6/2012 | A41D 3/04 |
| CN | 202271606 | | 6/2012 | |
| CN | 102579202 | | 7/2012 | |
| CN | 202319182 | | 7/2012 | |
| CN | 202476605 | | 10/2012 | |
| CN | 202490093 | U * | 10/2012 | A01G 9/1438 |
| CN | 202556842 | | 11/2012 | |
| CN | 202640910 | | 1/2013 | |
| CN | 203096486 | | 7/2013 | |
| CN | 103238965 | | 8/2013 | |
| CN | 103637882 | A * | 3/2014 | A41D 27/28 |
| DE | 929001 | C * | 6/1955 | A41D 27/28 |
| DE | 1 005 037 | | 3/1957 | |
| DE | 1 560 826 | | 1/1971 | |
| DE | 8702204 | U1 * | 8/1987 | A01G 9/1438 |
| DE | 37 24 510 | | 2/1989 | |
| DE | 282 937 | | 9/1990 | |
| DE | 9318838 | U1 * | 2/1994 | A41D 3/04 |
| EP | 0238014 | A2 * | 9/1987 | A41D 27/06 |
| EP | 0306818 | A2 * | 3/1989 | B32B 27/02 |
| EP | 0 403 187 | | 12/1990 | |
| EP | 0 589 225 | | 3/1994 | |
| EP | 0 825 018 | | 2/1998 | |
| EP | 0934736 | A1 * | 8/1999 | A61F 13/512 |
| EP | 1040801 | A1 * | 10/2000 | A61F 13/5146 |
| EP | 1066764 | A1 * | 1/2001 | A41D 3/04 |
| EP | 1 543 957 | | 6/2005 | |
| FR | 2 612 948 | | 9/1988 | |
| GB | 1162977 | A * | 9/1969 | B05D 3/12 |
| GB | 1 220 405 | | 1/1971 | |
| GB | 1237127 | A * | 6/1971 | E04D 5/12 |
| GB | 1 364 455 | | 8/1974 | |
| JP | 51-60250 | | 5/1976 | |
| JP | 53-111167 | | 9/1978 | |
| JP | 01165432 | A * | 6/1989 | B05D 3/12 |
| JP | 5-86216 | | 4/1993 | |
| JP | 5-124157 | | 5/1993 | |
| JP | 5-220880 | | 8/1993 | |
| JP | 6-32283 | | 2/1994 | |
| JP | 11-170468 | | 6/1999 | |
| JP | 11-348163 | | 12/1999 | |
| JP | 2001-279580 | | 10/2001 | |
| TW | 201202506 | | 1/2012 | |
| WO | WO 94/24354 | | 10/1994 | |
| WO | WO-9424354 | A1 * | 10/1994 | A61F 13/15731 |
| WO | WO-9815399 | A1 * | 4/1998 | A61F 13/15731 |
| WO | WO-9948653 | A1 * | 9/1999 | B26D 7/14 |
| WO | WO 01/03914 | | 1/2001 | |

OTHER PUBLICATIONS

English Abstract for JP 70038760 B, Nov. 1966.

Notice of Allowance issued in U.S. Appl. No. 14/294,613 dated May 22, 2017.

* cited by examiner

BREATHABLE AND WATERPROOF COMPOSITE FABRIC AND A METHOD OF MAKING THE SAME

CROSS-REFERENCE TO RELATED APPLICATION

This is a continuation-in-part of U.S. application Ser. No. 14/294,613, filed Jun. 3, 2014, which claims priority of Taiwanese Patent Application No. 102120734, filed Jun. 11, 2013.

FIELD

This invention relates to a breathable and waterproof composite fabric, more particularly to a breathable and waterproof composite fabric including a fabric sheet and a plastic film having hollow protrusions.

BACKGROUND

FIG. 1 illustrates a Gore-Tex® breathable and waterproof fabric for outdoor clothing. The Gore-Tex® breathable and waterproof fabric includes an outer shell 11, an inner liner 12, and a triply structure interposed between the outer shell 11 and the inner liner 12. The triply structure includes a breathable and waterproof sponge-like porous membrane 13 sandwiched between two protection layers 14. The porous membrane 13 is made from a polymer, such as Teflon®, polyvinylidene fluoride (PVDF), and polyurethane, and is formed with pores in a known manner, such as that disclosed in U.S. Pat. Nos. 3,953,566 and 4,187,390. The pores formed in the porous membrane 13 have a pore diameter in the order of less than one micron in order to permit transpiration of water vapor therethrough and prevent water from passing therethrough. The porous membrane 13 has a thickness ranging from 50 microns to several hundreds of microns.

Referring to FIG. 2, U.S. Patent Application Publication No. 2004/0256310 discloses a method of making a highly breathable and waterproof fabric including a multilayered fabric sheet 21, a breathable and waterproof sponge-like porous membrane 22 (with a trademark NanoTex®) formed on the fabric sheet 21, and a hydrophilic layer 23 formed on the porous membrane 22. The method involves the steps of providing a solution of PVDF in a solvent, coating the solution on the fabric sheet 21 to form a film of the solution, and bringing a liquid material into contact with the film so as to leach the solvent from the solution of PVDF and to cause gelation of PVDF so as to form the porous membrane 22 on the fabric sheet 21. The porous membrane 22 has a pore size ranging from 100 nm to 10 μm, and preferably ranging from 100 nm to 1000 nm so as to obtain satisfactory waterproofness and breathability. In one example, the porous membrane 22 has a maximum pore size of about 0.3 μm in order to be waterproof under a 60 mph raindrop velocity. Moreover, the porous membrane has a breathability ranging from 4000 to 10000 g/m2/day. It is noted that FIG. 4 of the specification of U.S. Patent Application Publication No. 2004/0256310 shows a comparison between a structure of the porous membrane 22 (NanoTex®) and a structure of the porous membrane 13 (Gore-Tex®) of FIG. 1. Both of the structures show irregular and randomly distributed pores.

The costs of making the aforesaid porous membranes 13, 22 are high.

SUMMARY

Therefore, an object of the disclosure is to provide a breathable and waterproof composite fabric that can alleviate at least one of the drawbacks of the prior art.

The breathable and waterproof composite fabric includes a fabric sheet and a first waterproof plastic film.

The fabric sheet has a first surface, a second surface that is opposite to the first surface, and a plurality of micropores that extend through the first and second surfaces.

The first waterproof plastic film is made of a non-porous material and has an outer surface, an inner surface that is opposite to the outer surface and that is bonded to the first surface of the fabric sheet, and a plurality of first hollow protrusions that protrude from the outer surface in a direction opposite to the fabric sheet. Each of the first hollow protrusions defines a first channel that extends through the inner and outer surfaces and that has an inner open end at the inner surface, and an outer open end distal from the inner and outer surfaces. The first channel of each of the protrusions extends curvedly from the inner open end to the outer open end.

According to another aspect of the disclosure, a breathable and waterproof composite fabric includes a fabric sheet, a first waterproof plastic film, and an adhesive pattern layer.

The fabric sheet has a first surface, a second surface that is opposite to the first surface, and a plurality of micropores that extend through the first and second surfaces.

The first waterproof plastic film is made of a non-porous material and has an outer surface, an inner surface that is opposite to the outer surface and that is bonded to the first surface of the fabric sheet, and a plurality of first hollow protrusions that protrude from the outer surface in a direction opposite to the fabric sheet. Each of the first hollow protrusions defines a first channel that extends through the inner and outer surfaces and that has an inner open end formed at the inner surface, and an outer open end distal from the inner and outer surfaces.

The adhesive pattern layer is disposed between and interconnects the first surface and the inner surface.

According to the other aspect of the disclosure, a method of making a breathable and waterproof composite fabric includes: applying an adhesive pattern layer on a fabric sheet in such a manner that the adhesive pattern layer uncovers micropores in the fabric sheet; bonding a first waterproof plastic film to the fabric sheet through the adhesive pattern layer; placing the fabric sheet and the waterproof plastic film over a screen mold; heating and softening the waterproof plastic film; and vacuum forming hollow protrusions in the waterproof plastic film by applying a suction force to the screen mold along a first direction that is transverse to the fabric sheet, followed by making relative movement between the waterproof plastic film and the screen mold along a second direction transverse to the first direction so as to dislocate the waterproof plastic film relative to the screen mold, thereby causing the hollow protrusions to change from the first direction to the second direction.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
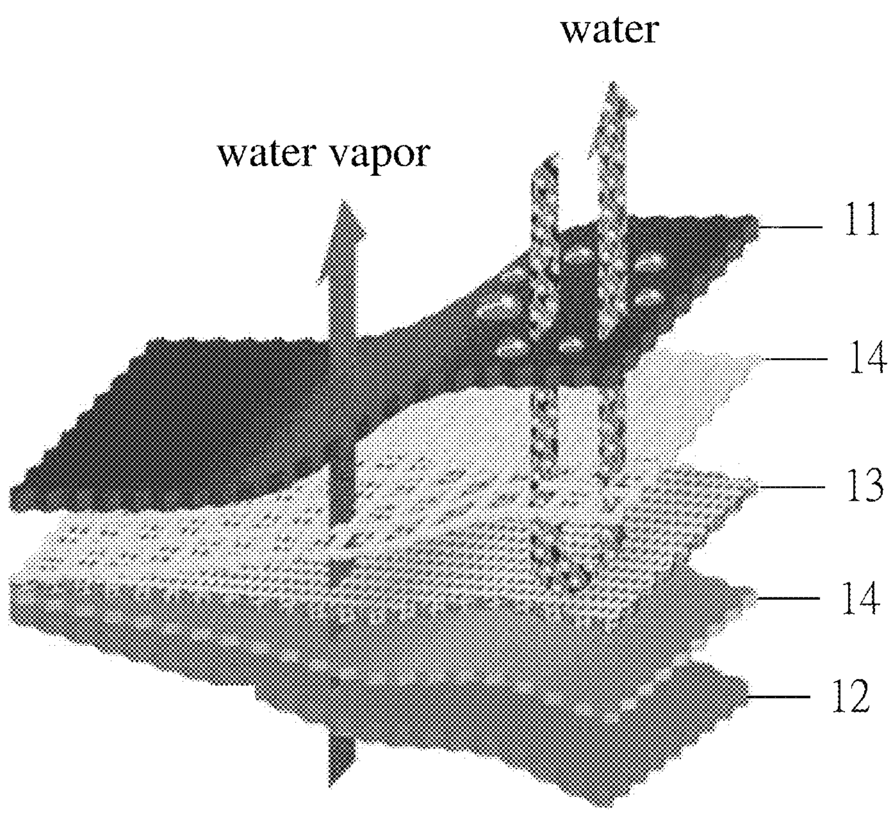
FIG. 1 is an exploded perspective view of a conventional breathable and waterproof fabric.
Figure 2:
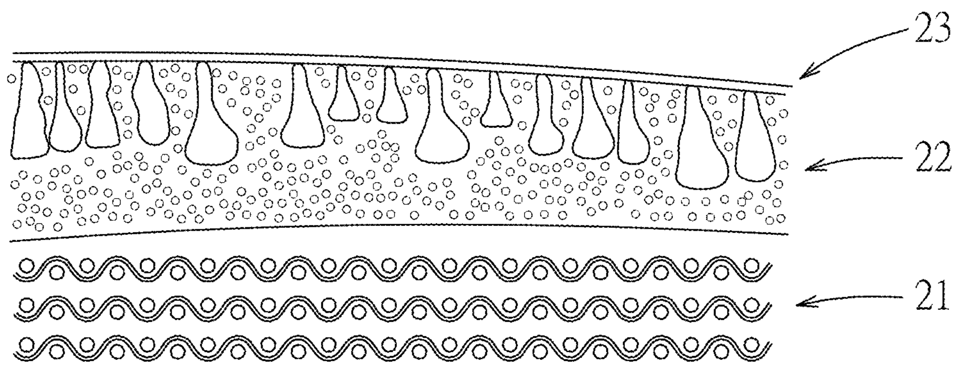
FIG. 2 is a schematic view of another conventional breathable and waterproof fabric.
Figure 3:
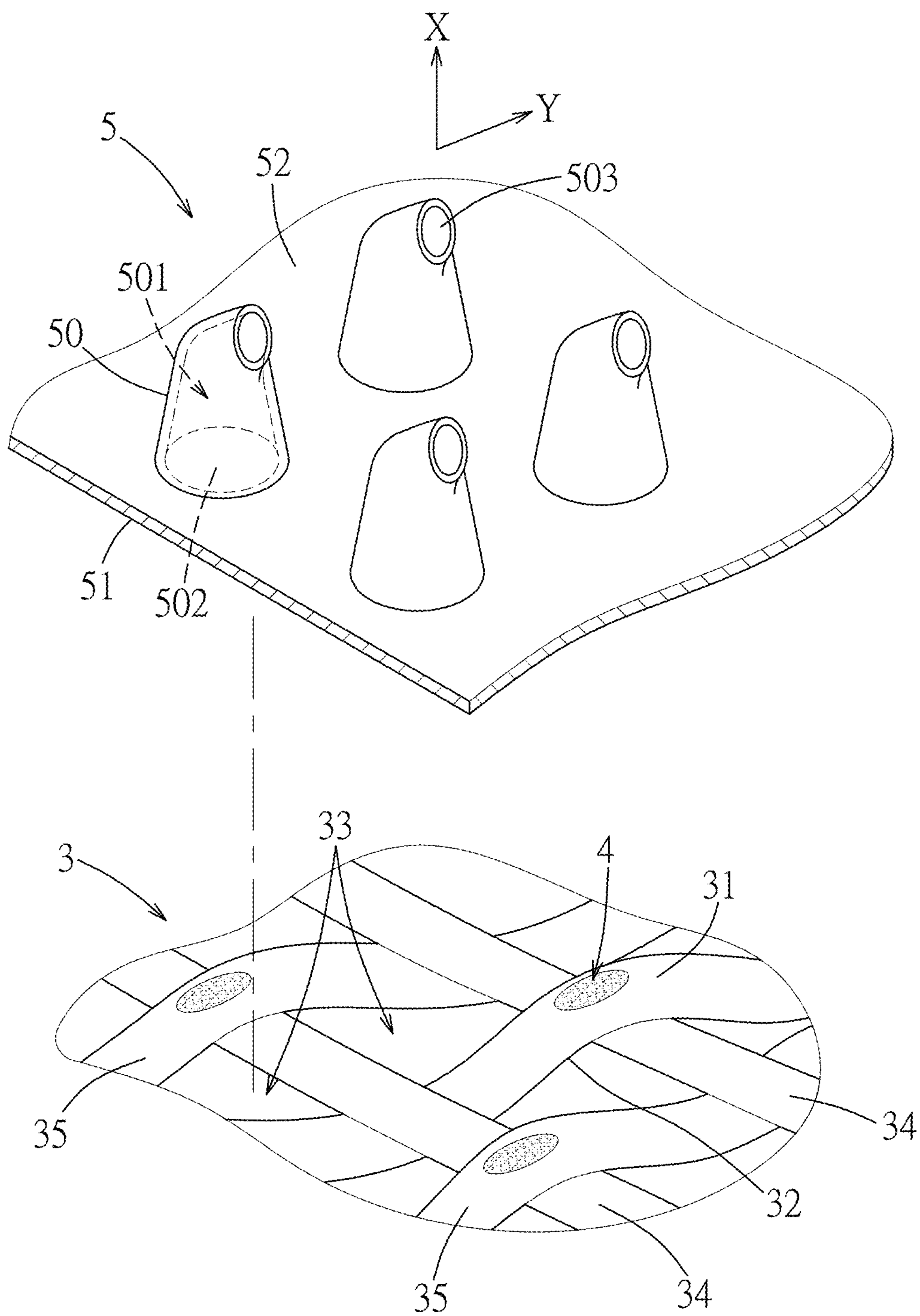
FIG. 3 is a fragmentary exploded perspective view of an embodiment of a breathable and waterproof composite fabric according to the disclosure.
Figure 4:
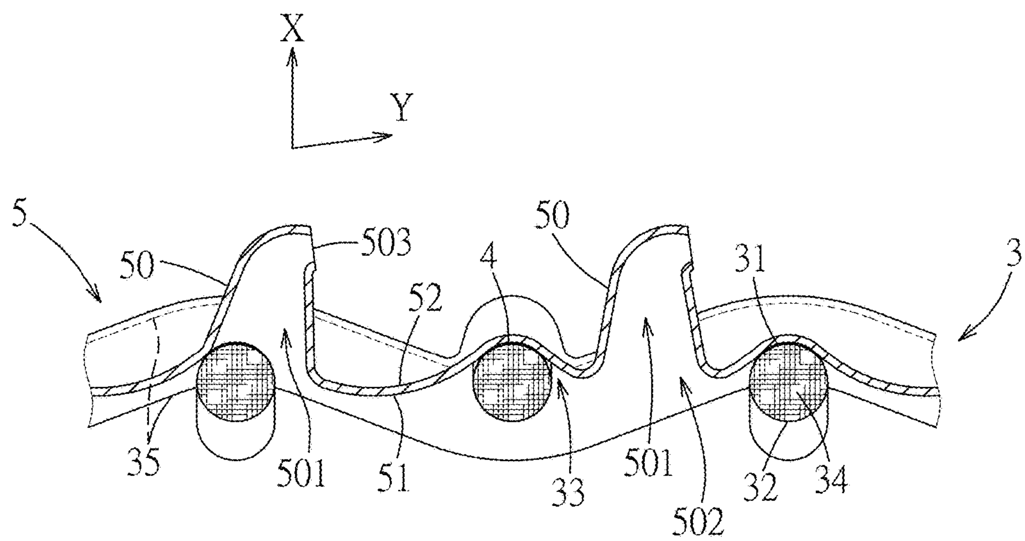
FIG. 4 is a fragmentary cross-sectional view of the embodiment.

Referring to FIGS. 3 and 4, the embodiment of the breathable and waterproof composite fabric according to the disclosure includes a fabric sheet 3 and a first waterproof plastic film 5.

The fabric sheet 3 has a first surface 31, a second surface 32 that is opposite to the first surface 31, and a plurality of micropores 33 that extend through the first surface 31 and the second surface 32.

The first waterproof plastic film 5 is made of a non-porous material and has an outer surface 52, an inner surface 51 that is opposite to the outer surface 52 and that is bonded to the first surface 31 of the fabric sheet 3, and a plurality of first hollow protrusions 50 that protrude from the outer surface 52 in a first direction (X) opposite to the fabric sheet 3. Each of the first hollow protrusions 50 defines a first channel 501 that extends through the inner surface 51 and the outer surface 52 and that has an inner open end 502 at the inner surface 51, and an outer open end 503 distal from the inner surface 51 and the outer surface 52. The first channels 501 allow water vapor to pass therethrough and prevent water from passing therethrough.

In one form, the first channel 501 of each of the first hollow protrusions 50 extends curvedly from the inner open end 502 to the outer open end 503. Specifically, the inner open end 502 and the outer open end 503 face in different directions that are transverse to each other.

In one form, the breathable and waterproof composite fabric further includes an adhesive pattern layer 4 disposed between and interconnecting the first surface 31 of the fabric sheet 3 and the inner surface 51 of the first waterproof plastic film 5.

The fabric sheet 3 may be made of a non-woven material of a woven material. In one form, the fabric sheet 3 includes a plurality of warps 34 and wefts 35 that interlace with one another to form the micropores 33. For instance, the warps 34 and the wefts 35 of the fabric sheet 3 are formed using knitting techniques.

In one form, the fabric sheet 3 may have a layered structure.

The adhesive pattern layer 4 may have a dot shape or a strip shape and uncover the micropores 33, so that the breathability of the fabric sheet 3 can be maintained. The forming material of the adhesive pattern layer 4 is commercially available.

In one form, the first channel 501 of each of the first hollow protrusions 50 has a funnel shape that is tapered from the inner open end 502 to the outer open end 503. Specifically, the first channel 501 of each of the first hollow protrusions 50 has a minimum diameter that is greater than 0.2 μm and smaller than 10 μm. More specifically, the minimum diameter of the first channel 501 of each of the first hollow protrusions 50 may be greater than 0.5 μm and smaller than 5 μm.

In one form, each of the micropores 33 of the fabric sheet 3 has a diameter that ranges from 20 μm to 200 μm.

The first waterproof plastic film 5 may be made from a thermoplastic material selected from the group consisting of polyolefins, polyesters, thermoplastic elastomers and combinations thereof. The first waterproof plastic film 5 may have a thickness that is measured from the inner surface 51 to the outer surface 52 and that ranges from 10 μm to 70 μm.

Figure 5:
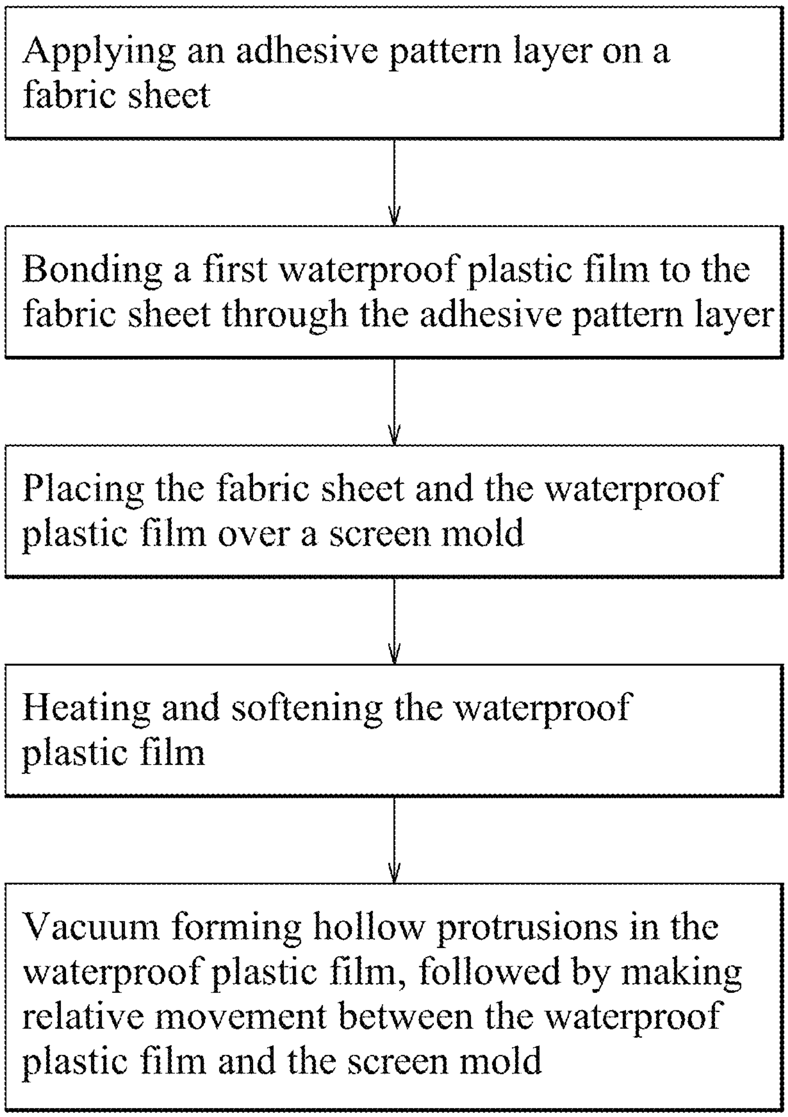
FIG. 5 is a process flow chart of a method of making the breathable and waterproof composite fabric according to the disclosure.

Referring to FIGS. 3 to 5, the embodiment of the breathable and waterproof composite fabric is formed by the following steps: applying the adhesive pattern layer 4 on the fabric sheet 3 in such a manner that the adhesive pattern layer 4 uncovers micropores 33 in the fabric sheet 3; bonding the outer surface 52 of the first waterproof plastic film 5 to the first surface 31 of the fabric sheet 3 through the adhesive pattern layer 4; placing the fabric sheet 3 and the first waterproof plastic film 5 over a screen mold (not shown); heating and softening the first waterproof plastic film 3; vacuum forming the first hollow protrusions 50 in the first waterproof plastic film 5 by applying a suction force to the screen mold along the first direction (X) that is transverse to the fabric sheet 3, followed by making relative movement between the first waterproof plastic film 5 and the screen mold along a second direction (Y) that is transverse to the first direction (X) so as to dislocate the first waterproof plastic film 5 relative to the screen mold, thereby causing the first channel 501 to change from the first direction (X) to the second direction (Y) to form the composite fabric; cooling the composite fabric; and separating the composite fabric from the screen mold. In the embodiment, the vacuum forming step is conducted using vacuum suction techniques.

The aforesaid method is advantageous in that the minimum diameter of each of the first channels 501 of the first waterproof plastic film 5 is easily controlled by adjusting the thickness of the first waterproof plastic film 5. A height of each of the hollow protrusions 50 may be adjustable by adjusting a mesh size of the screen mold, and a density of the first hollow protrusions 50 of the first waterproof plastic film 5 may be adjustable by adjusting the quantity of the meshes of the screen mold. The higher the density of the first hollow protrusions 50, the greater the breathability of the first waterproof plastic film 3. In one form, the first waterproof plastic film 5 may further include a plurality of additional protrusions (not shown) protruding from the outer surface 52 in the first direction (X). Each of the additional protrusions defines a blind channel that has an outer closing end distal from the inner surface 51 and the outer surface 52, so that the waterproofness of the composite fabric can be controlled by the additional protrusions.

Figure 6:
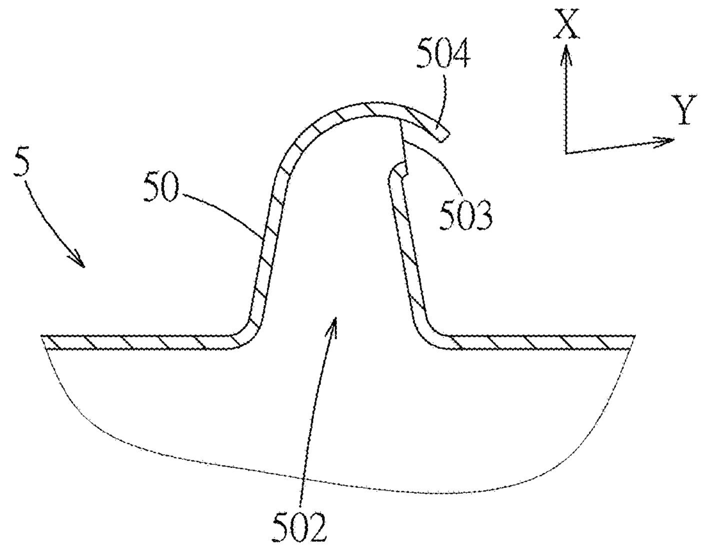
FIG. 6 is a fragmentary cross-sectional view of another configuration of the breathable and waterproof composite fabric according to the disclosure.

Referring to FIG. 6, in another configuration of the embodiment of the breathable and waterproof composite fabric, each of the first hollow protrusions 50 further includes an extending tab 504 that extends from the outer open end 503 and that is movable to cover or uncover the outer open end 503.

When water droplets fall on the first waterproof breathable plastic film 5, the extending tabs 504 bear the weight of the water droplets and are forced to cover the outer open end 503 of the first hollow protrusions 50.

Figure 7:
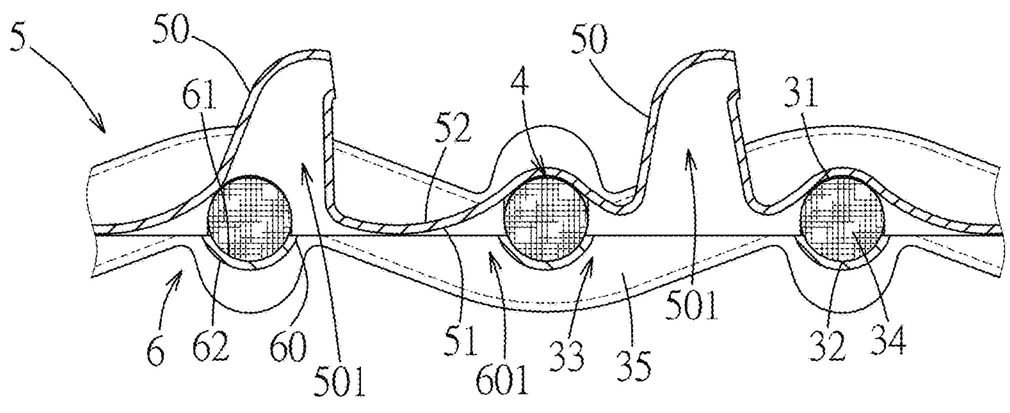
FIG. 7 is a fragmentary cross-sectional view of the other configuration of the breathable and waterproof composite fabric according to the disclosure.

Referring to FIG. 7, in another configuration of the embodiment of the breathable and waterproof composite fabric, the breathable and waterproof composite fabric further includes a second waterproof plastic film 6 that is made of a non-porous material. The second waterproof plastic film 6 includes an outer surface 62, an inner surface 61 that is opposite to the outer surface 62 and that is bonded to the second surface 32 of the fabric sheet 3, and a plurality of second hollow protrusions 60 each of which extends into one of the micropores 33 of the fabric sheet 3.

Each of the second hollow protrusions 60 defines a second channel 601 that extends through the inner and outer surfaces 61, 62 of the second plastic film, so that the water vapor can pass through the second channels 601.

When the second waterproof plastic film 6 is intended to be formed, the second waterproof plastic film 6 is melt-bonded to the second surface 32 of the fabric sheet 3 prior to forming of the adhesive pattern layer 4 and the first waterproof plastic film 5 on the fabric sheet 3, followed by heating and softening of the second waterproof plastic film 6, after which the second hollow protrusions 60 are formed using the vacuum suction techniques to form the second waterproof plastic film 6. Therefore, the inner surface 61 of the second waterproof plastic film 6 corresponds in pattern to the embossed texture of the second surface 32 of the fabric sheet 3. Thereafter, the steps for forming the breathable and waterproof composite fabric illustrated in FIGS. 3 to 5 are performed.

In one form, the second hollow protrusions 60 may extend in a direction that is opposite to the first direction (X), such that the second hollow protrusions 60 do not extend into the micropores 33 of the fabric sheet 3.

The second waterproof plastic film 6 may be made from a thermoplastic material selected from the group consisting of polyolefins, polyesters, and thermoplastic elastomers.

By virtue of the design of the first and second channels 501, 601, the waterproofness and breathability of the first and second waterproof plastic films 5, 6 can be improved, and the aforesaid drawback associated with the prior art may be alleviated.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A breathable and waterproof composite fabric, comprising:

a fabric sheet having a first surface and a second surface that is opposite to said first surface, and a plurality of micropores extending through said first and second surfaces; and a first waterproof plastic film made of a nonporous material and having an outer surface, an inner surface that is opposite to said outer surface and that is bonded to said first surface of said fabric sheet, and a plurality of first hollow protrusions protruding from said outer surface in a direction opposite to said fabric sheet, each of said first hollow protrusions defining a first channel that extends through said inner and outer surfaces and that has an inner open end at said inner surface, and an outer open end distal from said inner and outer surfaces, said first channel extending curvedly from said inner open end to said outer open end wherein said inner open end and said outer open end face in different directions that are traverse to each other, wherein each of said first hollow protrusions includes an extending tab that extends from said outer open end and that is movable to cover or uncover said outer open end.

2. The breathable and waterproof composite fabric of claim 1, further comprising an adhesive pattern layer disposed between and interconnecting said first surface of said fabric sheet and said inner surface of said first waterproof plastic film.

3. The breathable and waterproof composite fabric of claim 2, wherein said adhesive pattern layer is dot shaped.

4. The breathable and waterproof composite fabric of claim 1, wherein said first channel of each of said first hollow protrusions has a funnel shape tapered from said inner open end to said outer open end.

5. The breathable and waterproof composite fabric of claim 1, wherein said first channel of each of said first hollow protrusions has a minimum diameter that is greater than 0.2 μm and smaller than 10 μm.

6. The breathable and waterproof composite fabric of claim 1, wherein said first channel of each of said first hollow protrusions has a minimum diameter that is greater than 0.5 μm and smaller than 5 μm.

7. The breathable and waterproof composite fabric of claim 1, wherein said first waterproof plastic film is made from a thermoplastic material selected from the group consisting of polyolefins, polyesters, thermoplastic elastomers and combinations thereof.

8. The breathable and waterproof composite fabric of claim 1, further comprising a second waterproof plastic film made of a non-porous material, including an outer surface, an inner surface that is opposite to said outer surface of said second waterproof plastic film and that is bonded to said second surface of said fabric sheet, and a plurality of second hollow protrusions each of which extends into one of said micropores;

wherein each of said second hollow protrusions defines a second channel that extends through said inner and outer surfaces of said second plastic film.

9. The breathable and waterproof composite fabric of claim 8 wherein said second plastic waterproof film is made from a thermoplastic material selected from the group consisting of polyolefins, polyesters and thermoplastic elastomers.

* * * * *